(12) United States Patent
Thusoo et al.

(10) Patent No.: US 6,430,646 B1
(45) Date of Patent: Aug. 6, 2002

(54) METHOD AND APPARATUS FOR INTERFACING A PROCESSOR WITH A BUS

(75) Inventors: Shalesh Thusoo, Milpitas; Niteen Patkar, Sunnyvale; Korbin Van Dyke, Sunol; Stephen C. Purcell, Mountain View, all of CA (US)

(73) Assignee: ATI International Srl, Barbados ( * ) Notice: Subject to any disclaimer, the term of this patent is extended or adjusted under 35 U.S.C. 154(b) by 0 days.

(21) Appl. No.: 09/377,004

(22) Filed: Aug. 18, 1999

(51) Int. Cl.$^7$ ............................................... G06F 13/00
(52) U.S. Cl. ...................... 710/305; 710/306; 711/100; 711/111; 711/150
(58) Field of Search ............................... 711/100, 111, 711/150, 151; 710/305–317

(56) References Cited

U.S. PATENT DOCUMENTS 6,061,765 A * 5/2000 Van Doren et al. .......... 711/145
6,101,581 A * 8/2000 Doren et al. ................. 711/141
6,105,108 A * 8/2000 Steely, Jr. et al. ........... 711/118
6,205,506 B1 * 3/2001 Richardson .................. 710/129

* cited by examiner

*Primary Examiner*—Rupal Dharia
(74) *Attorney, Agent, or Firm*—Vedder, Price, Kaufman & Kammholz

(57) ABSTRACT

A method and apparatus for interfacing a processor with a bus includes processing that begins by storing transactions initiated by the processor into a buffer. The processing then continues by selecting one of the transactions stored in the buffer and placing the selected transaction on the bus. The processing continues by monitoring progress of fulfillment of each transaction in the buffer and flagging a transaction when it has been successfully completed. The processing also includes processing at least two related transactions prior to selecting one of the transactions from the buffer where, if transactions can be processed locally, they do not need to be transported on the bus. In addition, the processing includes monitoring the bus for related transactions initiated by another processor such that these transactions can be more efficiently processed. The related transaction on the bus would correspond to a transaction queued in the buffer.

44 Claims, 4 Drawing Sheets

METHOD AND APPARATUS FOR INTERFACING A PROCESSOR WITH A BUS

TECHNICAL FIELD OF THE INVENTION

This invention relates generally to computer system architectures and more particularly to a processor interface.

BACKGROUND OF THE INVENTION

In a computer system (e.g., personal computer, laptop, personal digital assistant, etc.), the central processing unit (CPU) interfaces with a bus to communicate with other components in the computing system (e.g., north bridge). To support the interfacing, the CPU includes a plurality of cache line buffers (CLB), which provide the coupling to the bus. Typically, the CPU will include at least one CLB for fill operations (i.e., retrieving data from memory and storing it in cache) and at least one other CLB for flush operations (i.e., sending data from a cache to memory). In many systems, the CPU will contain a separate CLB for instruction cache fills, data cache fills, instruction cache flushes, and data cache flushes. While separate CLBs provide an easy implementation of an interface, it requires a substantial amount of circuitry, which increases die size.

In computing systems that include multiple CPUs, one bus interface implementation employs a separate integrated circuit to process bus arbitration and to provide the bus interfacing. As such the CPUs do not have direct access to the bus, which adds delays in the processing of data. In addition, the extra integrated circuit adds to the costs of the multiple CPU system, rendering it too costly for some applications.

Another multiple CPU computing system implementation has each CPU directly coupled to the bus, but each CPU is required to track the transactions of all of the CPUs. As such, each CPU is dependent upon the other CPUs to interface with the bus. For example, if the bus is capable for supporting eight concurrent transactions and the system includes three CPUs, each CPU will need to include a CLB capable of storing eight transactions. Each CLB stores the same data, thus limiting each CPUs number of transactions that may be queued in its CLB and creates a dependency between the CPUs.

Therefore, a need exists for a CPU interface that utilizes a single CLB for both cache and instruction transactions, and, in multiple CPU systems, allows the CPU to interface with the bus independently and to increase the number of transactions that it may queue with minimal additional CLB space.

DETAILED DESCRIPTION OF A PREFERRED EMBODIMENT

Generally, the present invention provides a method and apparatus for interfacing a processor with a bus. Such a method and apparatus includes processing that begins by storing transactions initiated by the processor into a buffer. The processing then continues by selecting one of the transactions stored in the buffer and placing the selected transaction on the bus. The processing continues by monitoring progress of fulfillment of each transaction in the buffer and flagging a transaction when it has been successfully completed. The processing also includes processing at least two related transactions prior to selecting one of the transactions from the buffer where, if transactions can be processed locally, they do not need to be transported on the bus. In addition, the processing includes monitoring the bus for related transactions initiated by another processor such that these transactions can be more efficiently processed. The related transaction on the bus would correspond to a transaction queued in the buffer. With such a method and apparatus, interfacing of a processor and a bus, which may be incorporated in a multi-processor system, is done utilizing a single cache line buffer and, in the multiprocessor system, each processor independently interfaces with the bus.

Figure 1:
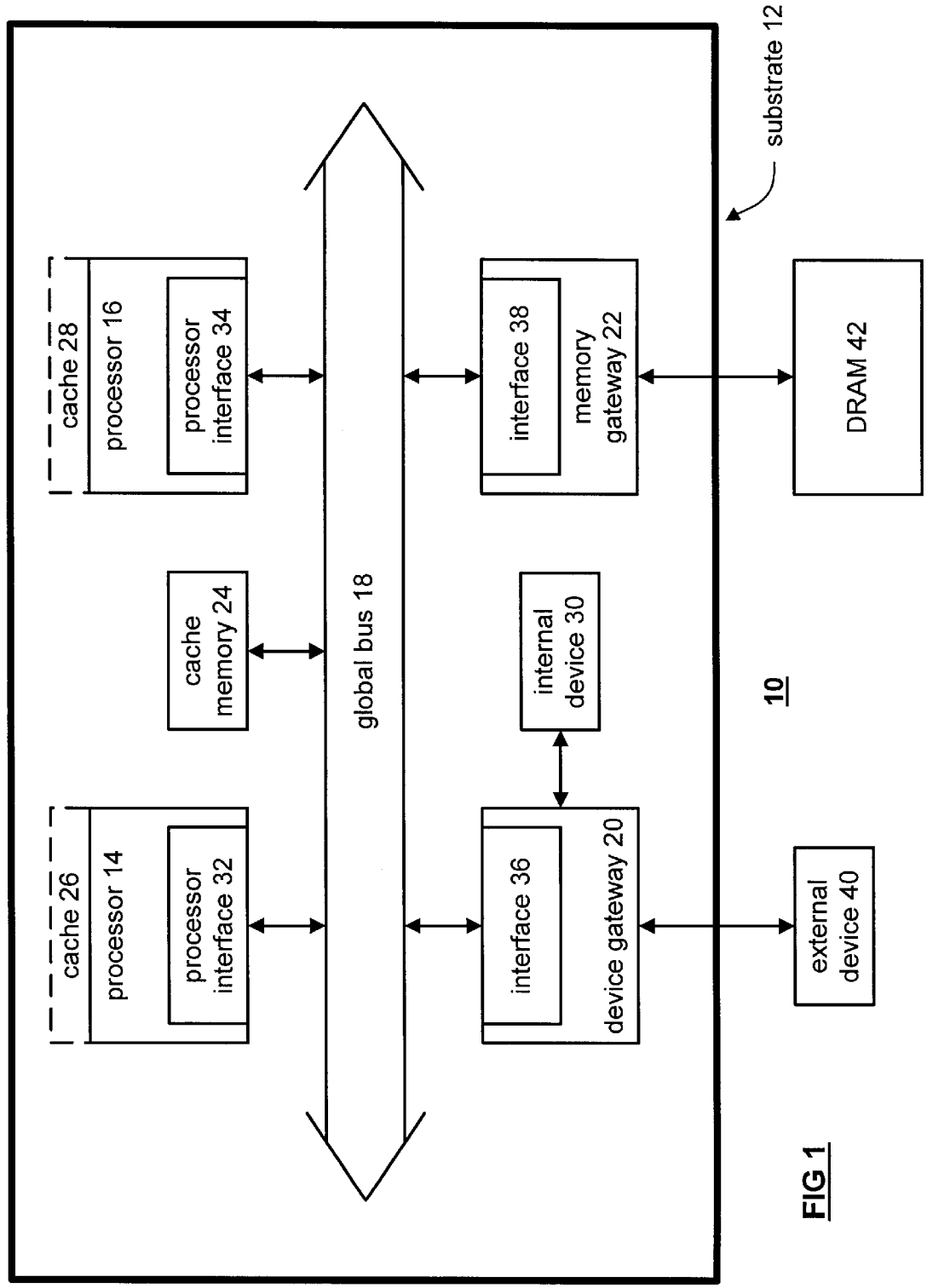
FIG. 1 illustrates a schematic block diagram of an integrated computing system in accordance with the present invention.

The present invention can be more fully described with reference to FIGS. 1 through 4. FIG. 1 illustrates a schematic block diagram of an integrated computing system 10 that includes a substrate 12, an external device 40 and dynamic random access memory (DRAM) 42. The external device may be a PCI device coupled to the PCI bus, which interfaces with the integrated computing system 10.

The substrate 12 supports the integrated computing system 10 which includes a plurality of processors 14 and 16, a global bus 18, a device gateway 20, and a memory gateway 22. The processors 14 and 16 include a processor interface 32 and 34 and may include cache memory 26 and 28. The system may further include cache memory 24, which is directly coupled to bus 18. In various embodiments of the system 10, cache 24 may be the only cache memory in the system and shared by processors 14 and 16, the system may only include cache memories 26 and 28, which are shared by the system, or may include cache memories 24 through 28. The processor interfaces 32 and 34 provide the processor, which may be a general processor (e.g., implementing an ×86 processor) or a specific function processor (e.g., video graphics processor, MPEG decoder, etc.). The details of processor interface 32 and 34 will be discussed in greater detail with reference to FIGS. 2 through 4.

The device gateway 20 includes an interface 36 for interfacing with the global bus. A portion of interface 36, which provides instructions, and/or data onto the global bus, will function in a similar manner as to processor interfaces 32 and 34. The other portion of interface 36 retrieves instructions and/or data from global bus 18. Such interfacing for retrieving data and/or instructions from the global bus are described in greater detail in co-pending patent application having an attorney docket number of 0100.9901050, entitled METHOD AND APPARATUS FOR INTERFACING A BUS WITH INPUT/OUTPUT DEVICES, having a filing date being the same as the filing date for this application, a serial number of "not assigned", and is assigned to the same assignee as the present patent application. The device gateway 20 provides an interface for internal devices 30 and external devices 40 to the global bus. Internal devices 30 include audio processing circuitry, modems, etc.

The memory gateway 22 includes interface 38, which is operable to retrieve data from the global bus 18. Memory gateway 22 is functional to provide an interface between a global bus 18 and DRAM 42. The functionality of interface 38 is described in the previously mentioned co-pending patent application.

Figure 2:
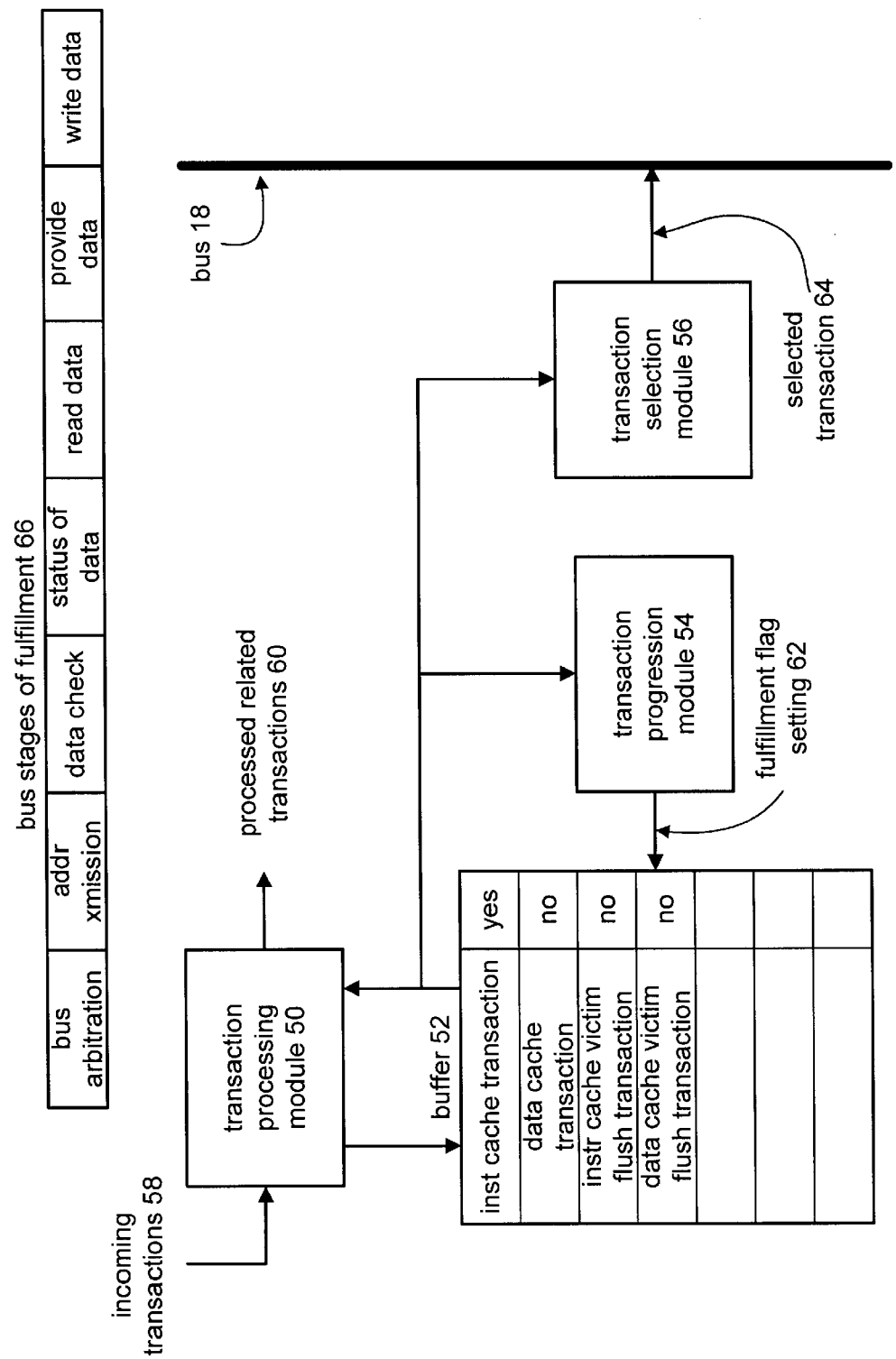
FIG. 2 illustrates a schematic block diagram of a processor interface in accordance with the present invention.

FIG. 2 illustrates a schematic block diagram of processor interface 32 or 34. The processor interface 32 or 34 includes a transaction processing module 50, buffer 52, transaction progression module 54, and transaction selection module 56. In operation, the transaction processing module 50 receives incoming transactions 58. Unless the incoming transaction 58 has a related transaction stored in buffer 52, the incoming transaction 58 will be stored in buffer 52. Such transactions include instruction cache transactions, data cache transactions, instruction cache victim flush transactions, and data cache victim flush transactions. If the incoming transaction 58 has a related transaction stored in buffer 52, the transaction processing module 50 will process the incoming transaction and related transaction to produce the processed related transaction 60. The related transactions may be store transactions for the data cache. The transaction processing module 50 processes these related store transactions by combining them into a single transaction. The single store transaction is then provided to buffer 52 and queued therein. Note that the related store transactions are addressing the same cache line and not necessarily the same memory location. As one of average skill in the art would appreciate, a cache line may be 32 bits, 64 bits, 128 bits, 256 bits, etc. wherein a particular memory location may be a single byte, double byte word, quadruple byte word, etc.

The transaction processing module 50 may process a related store transaction and a related load transaction by providing data of the related store transaction in response to the related load transaction. Note that the load transaction could be in the processor's pipeline, i.e., currently being processed, or contained in buffer 52. When the transaction processing module 50 is processing these related transactions, it prevents storage of the related load transaction in the buffer. Note that, for the transaction processing module 50 to process these related transactions, the store transaction precedes the load transaction.

The transaction processing module 50 may further process a related store or load transaction and a related victim flush transaction by providing the data of the victim flush transaction to the related store or load transaction. Note that the store or load transaction could be in the processor pipeline or within buffer 52. The transaction processing module 50 prevents storage of the related store or load transaction in the buffer and removes the victim flush transaction from the buffer if the victim flush transaction preceded the load store transaction.

The transaction processing module 50 may process two related load transactions, which are addressing the same cache line, by delaying entry of the second load transaction in the buffer until the first load transaction is completed. Alternatively, the second load transaction could be stored in the buffer and its processing delayed until the first load transaction is complete. As yet another alternative, the second load transaction may be stored at the same location in the buffer as the first load transaction and processed simulataneously.

The transaction progression module 54 monitors the progress of each transaction in buffer 52. The stages of fulfillment of a transaction are shown as the bus stages of fulfillment 66. As such, the pipeline stages on the bus include bus arbitration, address transmission, data check, status of data, read data, provide data, and write data. Note that the central processing unit issuing the transaction performs the bus arbitration, address transmission and write data. Other processing units on the bus perform the corresponding actions for the data check, status of the data, read data, and provide data stages. As the transactions in buffer 52 are being processed in accordance with the pipeline stage, the transaction progression module 54 monitors the stages. When the issuing central processing unit writes the data, or instruction, into the respective cache, the transaction progression module 54 issues a fulfillment flag setting 62 to buffer 52. The buffer stores the flags indicating whether the transaction is completed or not. In this example, a flag of "yes" indicates that the transaction is completed, while a flag of "no" indicates that the transaction is still in progress. Once a transaction has been flagged as completed, it may be overwritten with a new transaction.

The transaction selection module 56 retrieves a particular transaction from buffer 52 and places it on bus 18. The transaction selection module 56 may select a transaction based on a first-in, first-out process of buffer 52, a prioritization scheme based on the particular types of transaction, or a combination thereof.

In accordance with the pipeline stages 66, processing of a transaction begins when the central processing unit (i.e., the issuing processor) arbitrates for access to the bus. In the next stage, where a stage may be a single clock cycle or multiple clock cycles, the issuing processor transmits the address of the corresponding memory requests onto the bus. During the next pipeline stage, the central processing units, including the issuing processor, check to determine whether their local cache is storing the data. If so, the central processing unit (i.e., responding processor) transmits a hit message during the status of data pipeline stage, which is read by the issuing processor. During the next pipeline stage, the responding processor reads the data and, in the following pipeline stage, provides the data on the bus. During the seventh stage, the issuing processor writes the data into its local cache.

Figure 3:
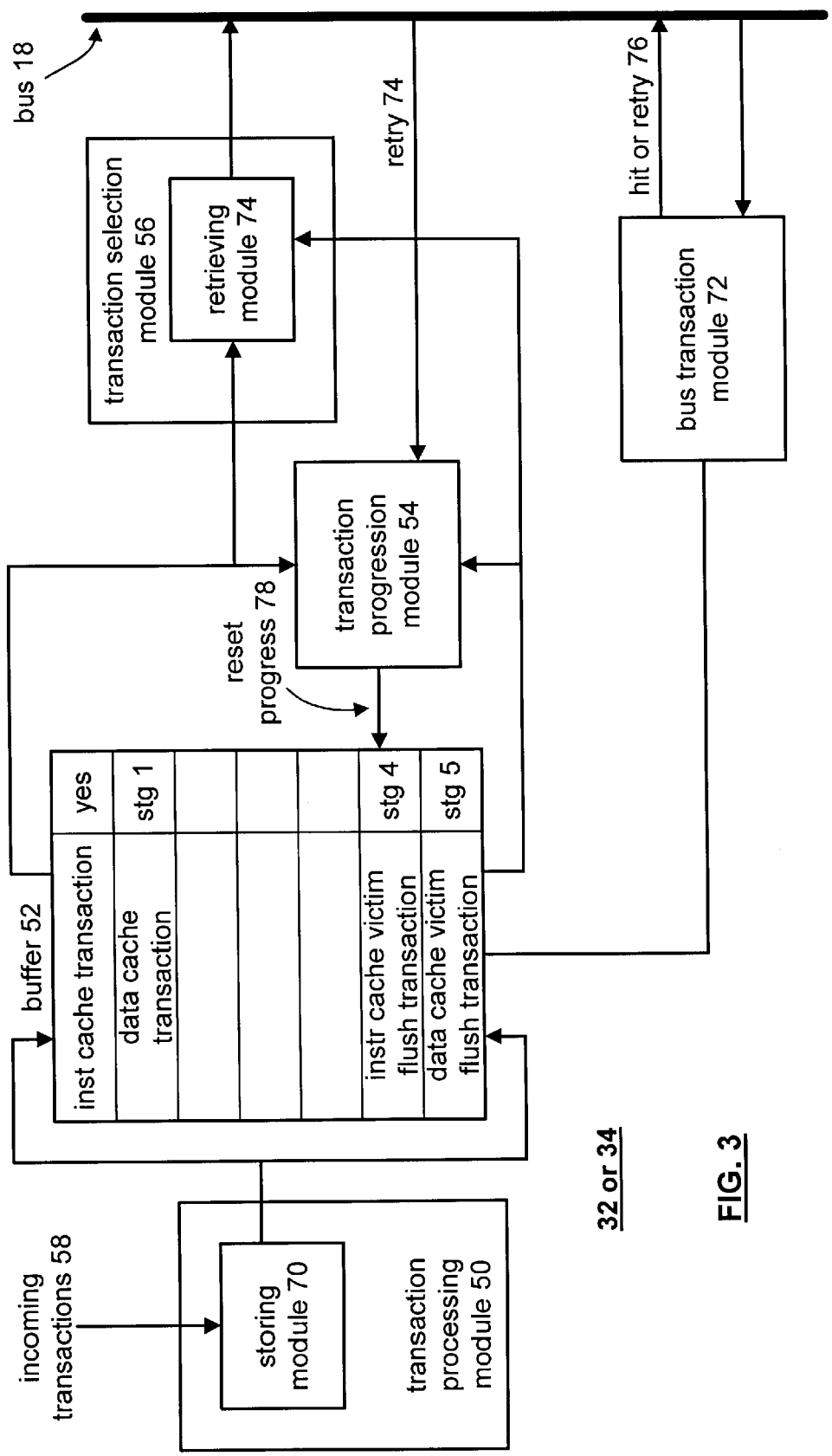
FIG. 3 illustrates a schematic block diagram of an alternate processor interface in accordance with the present invention.

FIG. 3 illustrates a schematic block diagram of an alternate processor interface 32 or 34. The interface 32 or 34 includes the transaction module 50, buffer 52, the transaction progression module 54, the transaction selection module 56, and a bus transaction module 72. The transaction processing module 50 includes a storing module 70. The function of the transaction module 50 is as discussed with reference to FIG. 2 with the additional functionality of the storing module 70. The storing module 70, upon receiving incoming transactions 58, determines the type of transaction. Instruction cache transactions and data cache transactions are stored at one end of buffer 52 while instruction cache victim flushes and data cache victim flush transactions are stored at another end of buffer 52. The retrieving module 74, within transaction selection module 56, accesses buffer 52 in a top down approach such that the instruction cache and data cache transactions are given priority over victim flush transactions. In this manner, a simple priority scheme is established without multiple cache line buffers and without complex priority algorithms.

The transaction progression module 54 provides progress status information to the buffer for each of the transactions stored therein. As such, the status indicates the particular pipeline stage the corresponding transaction is in, where a yes status indicates that the transaction has been completed. The transaction progression module 54 is operably coupled to bus 18 to receive retry messages 74 for a particular transaction. As previously mentioned, during the status of data pipeline stage, the central processing units coupled to bus 18, including the issuing processor, determine whether they have the corresponding data stored in their local cache.

A retry message would be issued by a central processing unit when it has within its cache line buffer a corresponding transaction and the transaction is further along in the pipeline stage than the present transaction. As such, when the retry message is received by the transaction progression module 54, it resets the status of the corresponding transaction. The resetting of the transaction causes the transaction to be retried subsequently, which should occur after the corresponding transaction of another central processing unit is completed.

The bus transaction module 72 monitors transactions on the bus 18 and during the status of data pipeline stage for such transactions may issue a hit or retry message 76. The bus transaction module 72 issues a hit message when the transaction on the bus has a related victim flush transaction in buffer 52. This is a hit because both transactions are addressing the same cache line, thus the subsequent request by another processor, or the issuing processor, can be fulfilled without having to access external memory. As such, only one access to external memory is performed for two related requests to external memory. The bus transaction module further issues a hit message when the transaction in buffer 52 is a load or store operation and the transaction on the bus is a victim flush operation. As such, the data associated with the victim flush will be saved in cache such that it can be used to fulfill the load or store operation of the other processor, or the issuing processor.

The transaction monitoring module 72 issues the retry message when the transaction in the buffer is analogous to the transaction on the bus and when the related transaction is further processed, i.e., further along in the pipeline stage, than the transaction on the bus. As such, when two processors have the same the transaction pending, the one that is further along will be processed for both processors.

The processor interfaces of FIGS. 2 and 3 provide a central processing unit an independent interface with the bus. As such, the processors do not need to maintain the transaction status of the other central processing units in the system. Further, the processor interface utilizes a single buffer for storing all types of transactions thereby reducing the die size of the interface.

As one of average skill in the art will appreciate, the modules of FIGS. 2 and/or 3 may be separate processing devices or a single processing device and have associated memory. Such a processing device may be a microprocessor, digital signal processor, logic circuitry, state machine, and/or any device that manipulates data based on operational instructions. Note that if one or more of the modules are implemented via logic circuitry or a state machine, the memory storing the corresponding operational instructions will be imbedded in the circuitry comprising the logic circuitry and/or the state machine.

Figure 4:
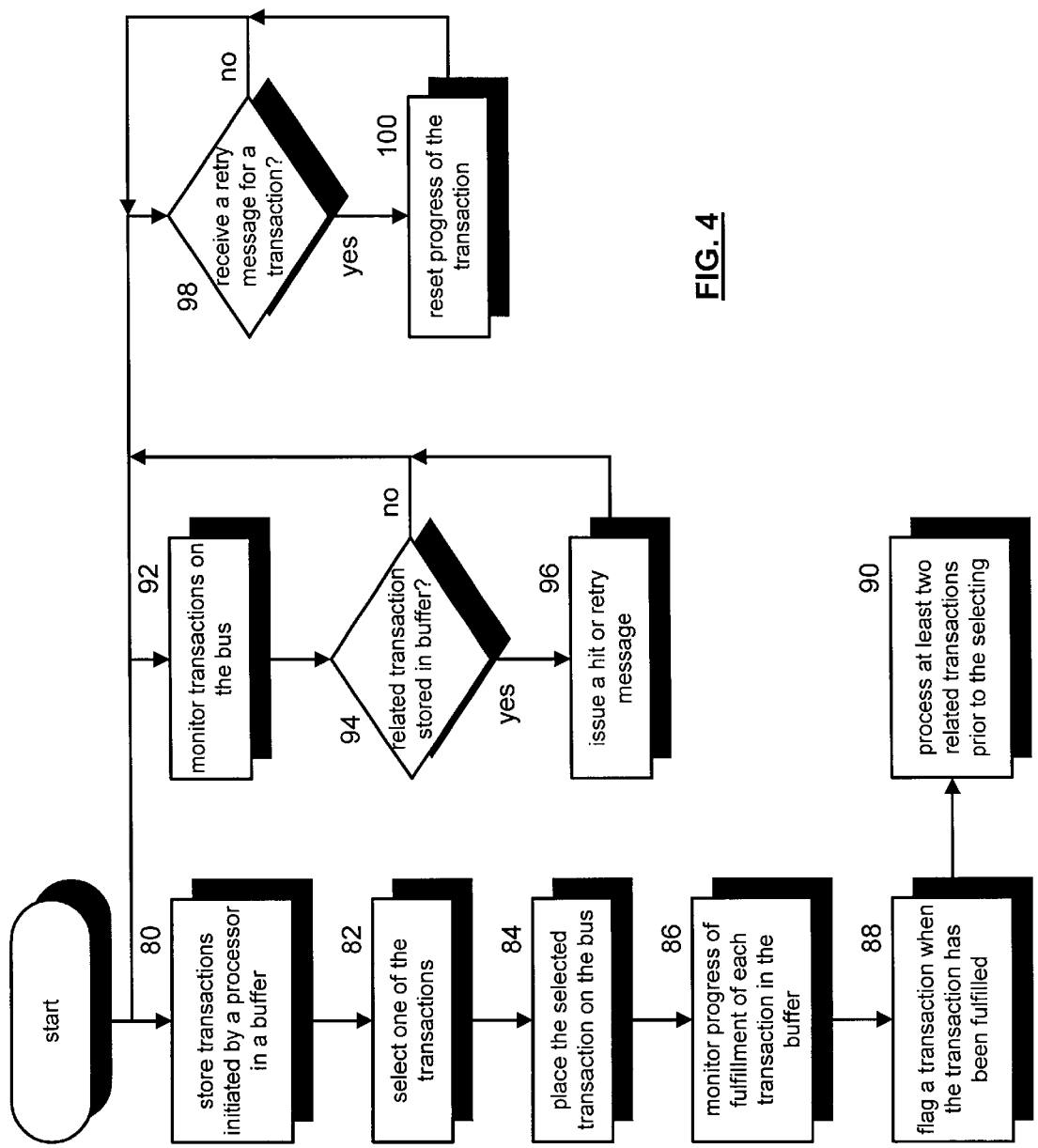
FIG. 4 illustrates a logic diagram of a method for providing interfacing between a processor and a bus in accordance with the present invention.

FIG. 4 illustrates a logic diagram of a method for providing an interface between a processor and a bus. Note that the steps of FIG. 4 may be performed by the corresponding modules of FIGS. 2 and 3 or by a single processing entity. The process begins at step 80 where transactions initiated by the processor are stored in a buffer. The transactions may be an instruction cache transaction (i.e., retrieve an instruction from memory and store in the instruction cache), a data cache transaction (i.e., retrieve data from memory and store it in the data cache), an instruction cache victim flush transaction, and a data cache victim flush transaction.

The process then proceeds to step 82 where one of the transactions is selected from the buffer. To facilitate the selection process and giving priority to the instruction cache and data cache transactions, the transactions may be stored in the buffer based on the type of transaction. As such, the retrieving of a transaction from the buffer then will be based on the location of storage thereby giving the priority to the instruction and data cache transactions as described above.

The process then proceeds to step 84 where the selected transaction is placed on the bus. The process then proceeds to step 86 where progress of fulfillment of each transaction in the buffer is monitored. The stages of fulfillment include the stages of the pipeline as discussed with reference to FIG. 2. The process then proceeds to step 88 where a transaction is flagged when it has been fulfilled. The process then proceeds to step 90 which may also be done in concurrence with steps 86 and 88, where at least two related transactions are processed prior to selecting. The processing of related transactions may be done by processing a first related store transaction and a second related store transaction by combining the first and second related store transactions into a single store transaction, which is then stored in the buffer. Note that the first and second related transactions are addressing the same cache line. The processing of related transactions may also be done by processing a related store transaction and a related load transaction by providing data of the related store transaction to the related load transaction. Having done this, the load transaction is prevented from being stored in the buffer. The related processing of two transactions may also be done by processing a related store or load transaction and a related victim flush transaction. Such processing may be done by providing data of the victim flush transaction to the related store or load transaction. Having done this, the storage of the related store or load transaction in the buffer is prevented and the victim flush transaction is removed from the buffer. Alternatively, the related store or load transaction and the victim flush transaction are removed from the buffer. The related processing of two transactions may further be done by processing two related load transactions. In processing two related load transactions, the entry of the second related load transaction is delayed until the first related load transaction is completed. Note that the related load transactions are addressing the same cache line.

In simultaneous operation to processing steps 80 through 90, the process of FIG. 4 also processes steps 92 through 96 and steps 98 and 100. At step 92, transactions on the bus are monitored. The process then proceeds to step 94 where a determination is made as to whether a related transaction is stored in the buffer. If not, the process is continued at step 92 for subsequent transactions. If a related transaction is stored, the process proceeds to step 96 where a hit or retry message is issued as previously described.

At step 98 a determination is made as to whether a retry message for a particular transaction has been received in the status of data pipeline stage. If not, the process continues for subsequent transactions. If so, the process proceeds to step 100 where the progress for this particular transaction is reset.

The preceding discussion has presented a method and apparatus for interfacing a processing unit with a bus. Such interfacing includes a single cache line buffer and allows processing units in a multi-processing unit system to be independent of each other. Therefore, more transactions may be queued by each processing unit while reducing integrated circuit real estate requirements.

What is claimed is:

1. A processor interface that interfaces a processor to a bus, the processor interface comprises:

a buffer for storing transactions initiated within the processor, wherein the transactions include at least one of: instruction cache transactions, data cache transactions, instruction cache victim flush transactions, and data cache victim flush transactions;

transaction selection module for selecting one of the transactions stored in the buffer, wherein the transaction selection module further functions to place the one of the transactions on the bus to be processed;

transaction progression module that monitors progress of fulfillment of each transaction in the buffer, wherein the transaction progress module flags a transaction when the transaction has been fulfilled; and transaction processing module that processes at least two related transactions prior to selection of at least one of the at least two transactions by the transaction selection module, wherein the at least one of the at least two transactions is stored in the buffer.

2. The processor interface of claim 1, wherein the transaction processing module further comprises:

storing module that causes the transactions to be stored in the buffer based on type of transaction;

and wherein the transaction selection module further comprises:

retrieving module that selects the one of the transactions from the buffer based on location of storage such that the instruction and data cache transactions have priority over the instruction and data victim flush transactions.

3. The processor interface of claim 1, wherein the progress of fulfillment of the transactions comprises stages of bus arbitration, address transmission, data check, status of data, read data, provide data, and write data.

4. The processor interface of claim 3 further comprises a bus transaction monitoring module that monitors transactions on the bus and determines whether the buffer is storing a related transaction to one of the transactions on the bus and when the buffer is storing a related transaction, the bus transaction monitoring module issues, during the data check stage for the one of the transactions on the bus, a hit or retry message.

5. The processor interface of claim 4, wherein the bus transaction monitoring module issues the hit message when the related transaction is a victim flush and the one of the transactions on the bus is one of: a load operation or a store operation.

6. The processor interface of claim 4, wherein the bus transaction monitoring module issues the retry message when the related transaction is analogous to the one of the transactions on the bus and when the related transaction is further processed than the one of the transactions on the bus.

7. The processor interface of claim 1, wherein the transaction progression module resets the progress of a transaction in the buffer when a retry message was received in a status stage for the transaction, wherein the resetting of the progress re-queues the transaction for selection by the transaction selection module.

8. The processor interface of claim 1, wherein the transaction processing module processes a first related store transaction and a second related store transaction by combining the first and second related store transactions into a single store transaction, wherein first and second related store transactions are addressing the same cache line.

9. The processor interface of claim 1, wherein the transaction processing module processes a related store transaction and a related load transaction by providing data of the related store transaction to the related load transaction, wherein the transaction processing module prevents storage of the related load transaction in the buffer.

10. The processor interface of claim 1, wherein the transaction processing module processes a related store or load transaction and a related victim flush transaction by providing the data of the victim flush to the related store or load transaction and prevents storage of the related store or load transaction in the buffer and removes the victim flush transaction from the buffer or removes the related store or load transaction and the victim flush transaction from the buffer.

11. The processor interface of claim 1, wherein the transaction processing module processes a related load transaction and a second related load transaction by at least one of:

delaying entry of the second related load transaction in the buffer until the related load transaction is complete, wherein related load transactions are addressing the same cache line;

storing the second related load transaction in the buffer and delaying processing of the second related load transaction until the processing of the first related load transaction is complete; and storing the second related load transaction at a same location in the buffer as the first related load transaction and processing the first and second related load transactions simultaneously.

12. A method for interfacing a processor with a bus, the method comprises the steps of:

a) storing transactions initiated by the processor, wherein the transactions include at least one of: instruction cache transactions, data cache transactions, instruction cache victim flush transactions, and data cache victim flush transactions;

b) selecting one of the transactions stored in the buffer;

c) placing the one of the transactions on the bus to be processed;

d) monitoring progress of fulfillment of each transaction in the buffer;

e) flagging a transaction when the transaction has been fulfilled such that the transaction is overwriteable with another transaction; and f) processing at least two related transactions prior to the selecting of at least one of the at least two transactions, wherein the at least one of the at least two transactions is stored in the buffer.

13. The method of claim 12, wherein steps (a) and (b) further comprise:

storing the transactions in a buffer based on type of transaction; and retrieving the one of the transactions from the buffer based on location of storage such that the instruction and data cache transactions have priority over the instruction and data victim flush transactions.

14. The method of claim 12, wherein the progress of fulfillment of the transactions comprises stages of bus arbitration, address transmission, data check, status of data, read data, provide data, and write data.

15. The method of claim 14 further comprises:

monitoring transactions on the bus;

determining whether a related transaction to one of the transactions on the bus is stored by the processor; and when the related transaction is stored, issuing, during the data check stage for the one of the transactions on the bus, a hit or retry message.

16. The method of claim 15 further comprises issuing the hit message when the related transaction is a victim flush and the one of the transactions on the bus is one of: a load operation or a store operation.

17. The method of claim 15 further comprises issuing the retry message when the related transaction is analogous to the one of the transactions on the bus and when the related transaction is further processed than the one of the transactions on the bus.

18. The method of claim 12 further comprises resetting the progress of a transaction when a retry message was received in a status stage for the transaction, wherein the resetting of the progress re-queues the transaction for subsequent selection.

19. The method of claim 12 further comprises processing a first related store transaction and a second related store transaction by combining the first and second related store transactions into a single store transaction, wherein first and second related store transactions are addressing the same cache line.

20. The method of claim 12 further comprises processing a related store transaction and a related load transaction by:
   providing data of the related store transaction to the related load transaction, wherein the transaction processing module;
   prevents storage of the related load transaction; and removing the related load transaction from storage.

21. The method of claim 12 further comprises processing a related store or load transaction and a related victim flush transaction by:
   providing the data of the victim flush to the related store or load transaction;
   preventing storage of the related store or load transaction in the buffer; and
   removing the victim flush transaction from storage or removing the related store or load transaction and the victim flush transaction from storage.

22. The method of claim 12 further comprises processing a related load transaction and a second related load transaction by at least one of:
   delaying entry of the second related load transaction in storage until the related load transaction is complete, wherein related load transactions are addressing the same cache line;
   storing the second related load transaction in the buffer and delaying processing of the second related load transaction until the processing of the first related load transaction is completed; and
   storing the second related load transaction at a same location in the buffer as the first related load transaction and processing the first and second related load transactions simultaneously.

23. A processor interface comprises:
   a processing module; and
   memory operably coupled to the processing module, wherein the memory stores operational instructions that cause the processing module to: (a) store transactions initiated by a processor, wherein the transactions include at least one of: instruction cache transactions, data cache transactions, instruction cache victim flush transactions, and data cache victim flush transactions; (b) select one of the transactions stored in the buffer; (c) place the one of the transactions on a bus to be processed; (d) monitor progress of fulfillment of each transaction in the buffer; (e) flag a transaction when the transaction has been fulfilled such that the transaction is overwriteable with another transaction; and (f) process at least two related transactions prior to the selecting of at least one of the at least two transactions, wherein the at least one of the at least two transactions is stored in the buffer.

24. The processor interface of claim 23, wherein the memory further comprises operational instructions that cause the processing module to:
   store the transactions in a buffer based on type of transaction; and
   retrieve the one of the transactions from the buffer based on location of storage such that the instruction and data cache transactions have priority over the instruction and data victim flush transactions.

25. The processor interface of claim 23, wherein the progress of fulfillment of the transactions comprises stages of bus arbitration, address transmission, data check, status of data, read data, provide data, and write data.

26. The processor interface of claim 25, wherein the memory further comprises operational instructions that cause the processing module to:
   monitor transactions on the bus;
   determine whether a related transaction to one of the transactions on the bus is stored by the processor; and
   issue, during the data check stage for the one of the transactions on the bus, a hit or retry message when the related transaction is stored.

27. The processor interface of claim 26, wherein the memory further comprises operational instructions that cause the processing module to: issue the hit message when the related transaction is a victim flush and the one of the transactions on the bus is one of: a load operation or a store operation.

28. The processor interface of claim 26, wherein the memory further comprises operational instructions that cause the processing module to: issue the retry message when the related transaction is analogous to the one of the transactions on the bus and when the related transaction is further processed than the one of the transactions on the bus.

29. The processor interface of claim 25, wherein the memory further comprises operational instructions that cause the processing module to: reset the progress of a transaction when a retry message was received in a status stage for the transaction, wherein the resetting of the progress re-queues the transaction for subsequent selection.

30. The processor interface of claim 23, wherein the memory further comprises operational instructions that cause the processing module to process a first related store transaction and a second related store transaction by combining the first and second related store transactions into a single store transaction, wherein first and second related store transactions are addressing the same cache line.

31. The processor interface of claim 23, wherein the memory further comprises operational instructions that cause the processing module to process a related store transaction and a related load transaction by:
   providing data of the related store transaction to the related load transaction, wherein the transaction processing module;
   preventing storage of the related load transaction.

32. The processor interface of claim 23, wherein the memory further comprises operational instructions that cause the processing module to process a related store or load transaction and a related victim flush transaction by:
   providing the data of the victim flush to the related store or load transaction;
   preventing storage of the related store or load transaction in the buffer; and removing the victim flush transaction from storage or removing the related store or load transaction and the victim flush transaction from storage.

33. The processor interface of claim 23, wherein the memory further comprises operational instructions that cause the processing module to process a related load transaction and a second related load transaction by at least one of:
   delaying entry of the second related load transaction in storage until the related load transaction is complete, wherein related load transactions are addressing the same cache line;
   storing the second related load transaction in the buffer and delaying processing of the second related load transaction until the processing of the first related load transaction is complete; and
   storing the second related load transaction at a same location in the buffer as the first related load transaction and processing the first and second related load transactions simultaneously.

34. A multi-processor computing system comprises:
   a first processor;
   a second processor;
   a bus;
   memory gateway operably coupled to the bus, wherein the memory gateway provides an interface to memory;
   an I/O gateway operably coupled to the bus, wherein the I/O gateway provides an interface to peripheral processing entities;
   a first processor interface operable to couple to the first processor to the bus; and
   a second processor interface operable to couple the second processor to the bus, wherein the first and second processors each include:
      a buffer for storing transactions initiated within the respective processor, wherein the transactions include at least one of: instruction cache transactions, data cache transactions, instruction cache victim flush transactions, and data cache victim flush transactions;
      a transaction selection module for selecting one of the transactions stored in the buffer, wherein the transaction selection module further functions to place the one of the transactions on the bus to be processed;
      a transaction progression module that monitors progress of fulfillment of each transaction in the buffer, wherein the transaction progress module flags a transaction when the transaction has been fulfilled; and
      a transaction processing module that processes at least two related transactions prior to selection of at least one of the at least two transactions by the transaction selection module, wherein the at least one of the at least two transactions is stored in the buffer.

35. The multi-processor computing system of claim 34, wherein the transaction processing module further comprises:
   a storing module that causes the transactions to be stored in the buffer based on type of transaction;
   and wherein the transaction selection module further comprises:
      a retrieving module that selects the one of the transactions from the buffer based on location of storage such that the instruction and data cache transactions have priority over the instruction and data victim flush transactions.

36. The multi-processor computing system of claim 34, wherein the progress of fulfillment of the transactions comprises stages of bus arbitration, address transmission, data check, status of data, read data, provide data, and write data.

37. The multi-processor computing system of claim 36, wherein the first and second processor interfaces each further comprise a bus transaction monitoring module that monitors transactions on the bus and determines whether the buffer is storing a related transaction to one of the transactions on the bus and when the buffer is storing a related transaction, the bus transaction monitoring module issues, during the data check stage for the one of the transactions on the bus, a hit or retry message.

38. The multi-processor computing system of claim 36, wherein the bus transaction monitoring module issues the hit message when the related transaction is a victim flush and the one of the transactions on the bus is one of: a load operation or a store operation.

39. The multi-processor computing system of claim 36, wherein the bus transaction monitoring module issues the retry message when the related transaction is analogous to the one of the transactions on the bus and when the related transaction is further processed than the one of the transactions on the bus.

40. The multi-processor computing system of claim 34, wherein the transaction progression module resets the progress of a transaction in the buffer when a retry message was received in a status stage for the transaction, wherein the resetting of the progress re-queues the transaction for selection by the transaction selection module.

41. The multi-processor computing system of claim 34, wherein the transaction processing module processes a first related store transaction and a second related store transaction by combining the first and second related store transactions into a single store transaction, wherein first and second related store transactions are addressing the same cache line.

42. The multi-processor computing system of claim 34, wherein the transaction processing module processes a related store transaction and a related load transaction by providing data of the related store transaction to the related load transaction, wherein the transaction processing module prevents storage of the related load transaction in the buffer.

43. The multi-processor computing system of claim 34, wherein the transaction processing module processes a related store or load transaction and a related victim flush transaction by providing the data of the victim flush to the related store or load transaction and prevents storage of the related store or load transaction in the buffer and removes the victim flush transaction from the buffer or removes the related store or load transaction and the victim flush transaction from the buffer.

44. The multi-processor computing system of claim 34, wherein the transaction processing module processes a related load transaction and a second related load transaction by delaying entry of the second related load transaction in the buffer until the related load transaction is complete, wherein related load transactions are addressing the same cache line.

* * * * *